US012756929B2

(12) United States Patent
Yokomizo

(10) Patent No.: US 12,756,929 B2
(45) Date of Patent: Oct. 6, 2026

(54) IMAGE CAPTURE APPARATUS AND METHOD OF CONTROLLING IMAGE CAPTURE APPARATUS, AND NON-TRANSITORY COMPUTER-READABLE MEDIUM

(71) Applicant: CANON KABUSHIKI KAISHA, Tokyo (JP)

(72) Inventor: Tsuyoshi Yokomizo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 18/642,574

(22) Filed: Apr. 22, 2024

(65) Prior Publication Data

US 2024/0365001 A1 Oct. 31, 2024

(30) Foreign Application Priority Data

Apr. 25, 2023 (JP) ................................ 2023-071691

(51) Int. Cl.
*H04N 23/661* (2023.01)
*H04N 23/667* (2023.01)

(52) U.S. Cl.
CPC ......... *H04N 23/661* (2023.01); *H04N 23/667* (2023.01)

(58) Field of Classification Search
CPC .. H04N 23/661; H04N 23/667; H04N 23/634; H04N 23/66
See application file for complete search history.

(56) References Cited

U.S. PATENT DOCUMENTS

2017/0150051 A1* 5/2017 Ito .......................... G03B 17/48
2018/0309923 A1* 10/2018 Kaihatsu .................. G02B 7/28

FOREIGN PATENT DOCUMENTS

JP 2016127499 A 7/2016
JP 2020088513 A 6/2020
JP 2022070601 A 5/2022
JP 2022081894 A 6/2022
JP 2023090316 A 6/2023

* cited by examiner

*Primary Examiner* — Christopher K Peterson
(74) *Attorney, Agent, or Firm* — Canon U.S.A., Inc. IP Division

(57) ABSTRACT

An image capture apparatus is provided. The apparatus notifies an external apparatus of control information of the image capture apparatus that affects a captured image, in response to a change in the control information. The apparatus determines whether or not to perform control for restricting notification of the control information to the external apparatus, based on whether or not the image capture apparatus is operating in a specific mode. The apparatus has a plurality of modes. The plurality of modes include a first mode in which the image capture apparatus changes the control information in accordance with an instruction from an external apparatus, and a second mode in which the image capture apparatus automatically changes the control information. The specific mode is the second mode.

16 Claims, 6 Drawing Sheets

FIG. 6

600

| | 601 CONTROL INFORMATION | 602 THRESHOLD |
|---|---|---|
| 603 | FOCUS VALUE | 100 |
| 604 | F VALUE | 5 |
| 605 | GAIN | 20 |
| 606 | WB | 100 |

IMAGE CAPTURE APPARATUS AND METHOD OF CONTROLLING IMAGE CAPTURE APPARATUS, AND NON-TRANSITORY COMPUTER-READABLE MEDIUM

BACKGROUND OF THE DISCLOSURE

Field of the Disclosure

The present disclosure relates to an image capture apparatus and a method for controlling an image capture apparatus, and a non-transitory computer-readable medium, and particularly relates to a method for notification of control information of an image capture apparatus.

Description of the Related Art

In recent years, there have been an increasing number of image distribution systems for distributing images via a network. Such distribution systems are employed, for example, in Internet sites that distribute the conditions of ski resorts or zoos. Also, such distribution systems are employed to monitor stores or buildings. Furthermore, video distribution and camera control via a network are also used in the field of video production. An internet protocol (IP) network such as the Internet is used as a network. A system such as Web View or XC protocol is known as a concrete example.

In such a system, an image capture apparatus can notify a client of information (control information) indicating the current state of the image capture apparatus, in response to a request from the client. For example, Japanese Patent Laid-Open No. 2016-127499 discloses that upon receiving a request for information indicating an image capture direction from a client, an image capture apparatus transmits the information to the client. Also, Japanese Patent Laid-Open No. 2022-70601 discloses that image capture information including an image capture direction is transmitted to a client apparatus at a set interval.

SUMMARY OF THE DISCLOSURE

According to an embodiment of the present disclosure, an image capture apparatus comprises: an image sensor configured to perform image capture to generate a captured image; a communication interface configured to notify an external apparatus of control information of the image capture apparatus that affects the captured image, in response to a change in the control information; and a controller configured to determine whether or not to perform control for restricting notification of the control information to the external apparatus, based on whether or not the image capture apparatus is operating in a specific mode, wherein the image capture apparatus has a plurality of modes, the plurality of modes include a first mode in which the image capture apparatus changes the control information in accordance with an instruction from an external apparatus, and a second mode in which the image capture apparatus automatically changes the control information, and the specific mode is the second mode.

Further features of the present disclosure will become apparent from the following description of exemplary embodiments (with reference to the attached drawings).

BRIEF DESCRIPTION OF THE DRAWINGS

FIG. 6 illustrates an example of a table indicating thresholds corresponding to types of control information.

DESCRIPTION OF THE EMBODIMENTS

Figure 1:
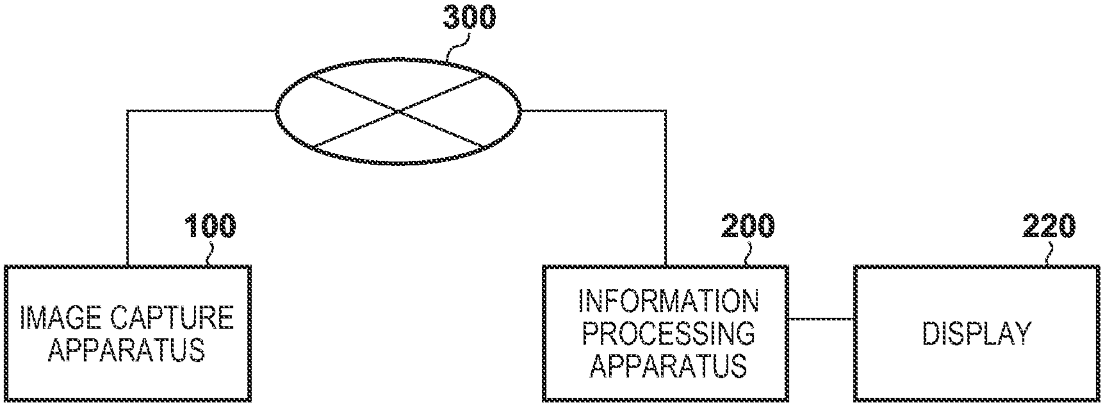
FIG. 1 illustrates an example of a configuration of an image capture system according to an embodiment.

Hereinafter, embodiments will be described in detail with reference to the attached drawings. Note, the following embodiments are not intended to limit the scope of the present disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

An image capture apparatus may notify a client of control information at a timing at which the control information has been changed. For example, the image capture apparatus that has received a control information request from a client may notify the client of control information that has changed from that at the time of the response to the previous request, at a timing of the change in the control information. According to this function, when control information is changed by another client, and when control information is automatically changed by the image capture apparatus, a client can reflect the changed control information on an UI or the like. Quickly notifying a client of a change in control information improves the response of information display such as a UI at the client.

Meanwhile, depending on the operation mode of the image capture apparatus, control information may be changed frequently and continuously. Information that affects a shot image, such as focus values, F numbers, or gains, is an example of control information. The image capture apparatus can automatically (e.g., autonomously) change such control information. In an auto mode, in which the image capture apparatus automatically changes control information, the control information may be changed frequently and continuously depending on the subject. In this case, also in a configuration in which control information is notified at a timing of a change, the control information will be frequently and continuously notified. At this time, there are possibilities that the processing load of the image capture apparatus or the client may increase, or a communication band congestion of the network used for the communication may occur. On the other hand, such issues are less likely to occur when the control information of the image capture apparatus is manually controlled.

According to an embodiment of the present disclosure, in a configuration in which an image capture apparatus notifies a client of control information of the image capture apparatus, more appropriate notification control is possible.

FIG. 1 shows an example of a configuration of an image capture system according to the present embodiment. The image capture system according to the present embodiment includes an image capture apparatus 100 and an information processing apparatus 200. The image capture apparatus 100 and the information processing apparatus 200 are connected to each other via a network 300. The configuration of the network 300 is not particularly limited. The network 300 may be constituted by a plurality of routers, switches, and cables that conform to a communication standard such as ETHERNET (registered trademark), for example. Also, the network 300 may be the Internet, a wired local area network (LAN), a wireless LAN (Wireless LAN), or a wide area network (WAN).

The image capture apparatus 100 is an apparatus that performs image capture to generate a captured image. The image capture direction in which the image capture apparatus 100 performs image capture may be controllable. The image capture apparatus 100 can transmit data on the captured image to an external apparatus such as the information processing apparatus 200 via the network 300. The image capture apparatus 100 may further transmit, to the external apparatus, metadata of the captured image (e.g., information on the date and time on which the image was captured), or identification information for identifying the image capture apparatus 100, in association with the captured image. Also, in the present embodiment, the image capture apparatus 100 can transmit control information of the image capture apparatus 100.

In this specification, the control information refers to control information that affects an image captured by the image capture apparatus 100. The control information may be information indicating image capture settings that are used by the image capture apparatus 100, for example. Examples of control information will be described later.

The information processing apparatus 200 is a client apparatus such as a personal computer, for example. The image capture system according to the present embodiment includes one image capture apparatus 100. Of course, it is also possible that the image capture system according to the present embodiment includes a plurality of image capture apparatuses 100. That is to say, the plurality of image capture apparatuses 100 may be connected to the information processing apparatus 200 via the network 300. In this case, the information processing apparatus 200 can determine which of the plurality of image capture apparatuses 100 has captured the captured image, based on the identification information associated with the transmitted captured image. A program for realizing the function of later-described processing can be installed in the information processing apparatus 200.

A display 220 is connected to the information processing apparatus 200. The display 220 can display, for example, the captured image transmitted from the image capture apparatus 100. The display 220 is a liquid crystal display (LCD), for example. The display 220 may be connected to the information processing apparatus 200 via a display cable conforming to a communication standard such as high definition multimedia interface (HDMI (registered trademark)). Note that the display 220 and the information processing apparatus 200 may be provided in a single housing.

Figure 2:
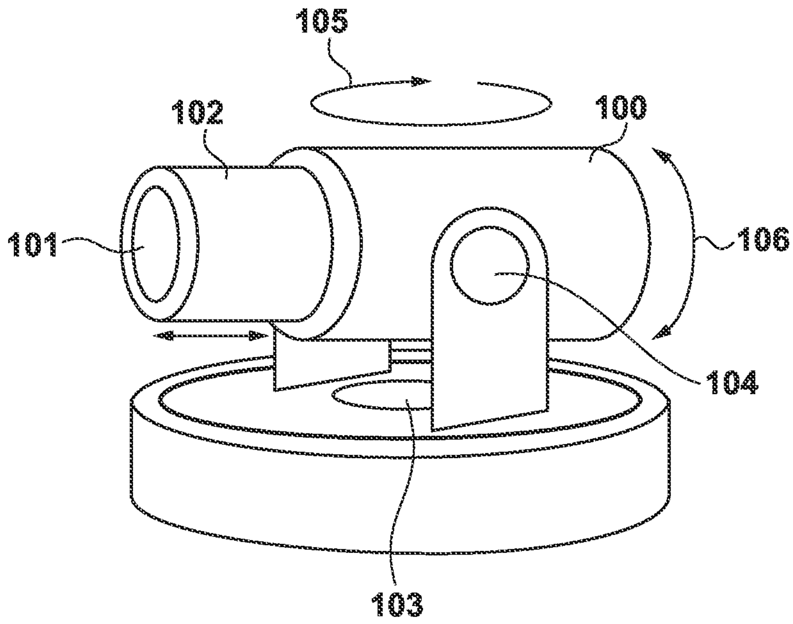
FIG. 2 illustrates an example of outer appearance of an image capture apparatus according to an embodiment.
Figure 3:
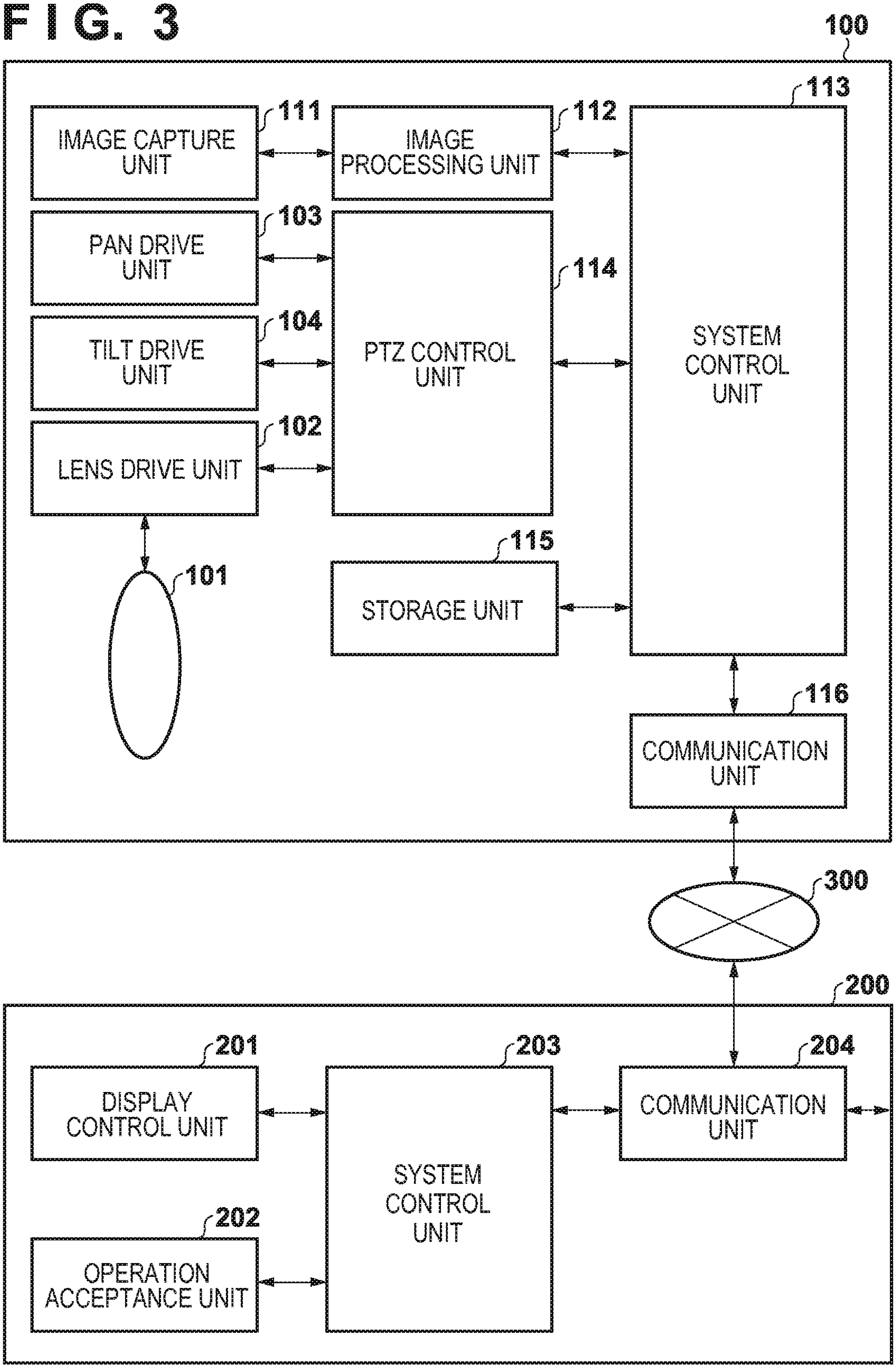
FIG. 3 illustrates examples of functional configurations of the image capture apparatus and an information processing apparatus according to an embodiment.

The following will describe the image capture apparatus 100 according to the present embodiment with reference to FIGS. 2 and 3. FIG. 2 shows an example of outer appearance of the image capture apparatus 100 according to the present embodiment. FIG. 3 shows examples of functional configurations of the image capture apparatus 100 and the information processing apparatus 200 according to the present embodiment.

The image capture direction of the image capture apparatus 100 is a direction in which the optical axis of a lens 101 is directed. A light flux having passed through the lens 101 forms an image on an image sensor of an image capture unit 111. A lens drive unit 102 is a drive system for driving the lens 101. The lens drive unit 102 can change the focal length of the lens 101. The lens drive unit 102 is controlled by a pan/tilt/zoom (PTZ) control unit 114.

A pan drive unit 103 drives the image capture apparatus 100 and rotates the image capture direction thereof in a pan direction 105. The pan drive unit 103 includes a mechanical drive system for performing pan operations, and a drive source such as a motor. The pan drive unit 103 is controlled by the PTZ control unit 114.

A tilt drive unit 104 drives the image capture apparatus 100 and rotates the image capture direction thereof in a tilt direction 106. The tilt drive unit 104 includes a mechanical drive system for performing tilt operations, and a drive source such as a motor. The tilt drive unit 104 is controlled by the PTZ control unit 114.

The image capture unit 111 performs image capture to generate a captured image. The image capture unit 111 includes an image sensor (not shown). Examples of the image sensor include a charge coupled device (CCD) sensor, or a complementary metal oxide semiconductor (CMOS) sensor. The image capture unit 111 generates electric signals by photoelectrically converting a subject image formed through the lens 101.

An image processing unit 112 generates image data based on the electric signals obtained by the image capture unit 111. The image processing unit 112 can convert the electric signals obtained by the image capture unit 111 into digital signals. Also, the image processing unit 112 can perform image processing such as compression coding processing on the digital signals indicating the image.

The PTZ control unit 114 controls the pan drive unit 103, the tilt drive unit 104, and the lens drive unit 102, in accordance with an instruction from a system control unit 113. With this, the PTZ control unit 114 can control the conditions for image capture of the image capture apparatus 100. For example, the PTZ control unit 114 can control the image capture direction of the image capture apparatus 100, the zoom value (field angle), or the focus. Images captured by the image capture apparatus 100 will be subject to the influence of such control of the PTZ control unit 114.

A storage unit 115 stores (holds) the control information of the image capture apparatus 100.

A communication unit 116 communicates with the information processing apparatus 200. The communication unit 116 can perform communication via an I/F 440, which will be described later with reference to FIG. 4. For example, the communication unit 116 can transmit data on an image captured by the image capture apparatus 100 to the information processing apparatus 200 via the network 300. Also, the communication unit 116 can transmit the control information of the image capture apparatus 100 to the information processing apparatus 200. Furthermore, the communication unit 116 can receive a control request, which is a command for controlling the image capture apparatus 100, from the information processing apparatus 200. The communication unit 116 can transmit the received control request to the system control unit 113.

The hypertext transfer protocol (HTTP) is an example of a communication protocol used when the communication unit 116 communicates with an external apparatus such as the information processing apparatus 200 via the network 300. The version of the HTTP is not particularly limited. For example, HTTP/1.0, HTTP/1.1, HTTP/2, and HTTP/3 can be used. Communication via a transport layer security (TLS) layer is also possible.

When the communication unit 116 has received an information acquisition request from the information processing apparatus 200, the communication unit 116 may adjust the timing of responding to the request in order to effectively use the network band. For example, when information to be transmitted to the information processing apparatus 200 is not changed from previously transmitted information, the communication unit 116 may withhold responding to the request. In this case, the communication unit 116 may respond to the request in response to a change in the information. For this, multipart or Transfer-encoding: chunked in HTTP/1.1 may be used. Also, DATAFRAME and PUSH PROMISE in HTTP/2 may be used.

In the present embodiment, the communication unit 116 can notify a different apparatus such as the information processing apparatus 200 of the control information of the image capture apparatus 100. As will be described with reference to FIGS. 5A and 5B, the communication unit 116 can perform notification of the control information in response to a change in the control information, in accordance with the control of the system control unit 113.

The system control unit 113 can control the entire image capture apparatus 100. For example, the system control unit 113 can perform the following processing. That is to say, the system control unit 113 analyzes the control request for controlling the image capture apparatus 100 that was transmitted from the communication unit 116. Then, the system control unit 113 performs processing in accordance with this control request. The system control unit 113 also instructs the PTZ control unit 114 to perform a pan/tilt/zoom operation. Also, the system control unit 113 causes the communication unit 116 to transmit image data generated by the image processing unit 112 to the information processing apparatus 200. At this time, the system control unit 113 can add metadata (for example, information on the time at which the image was captured) to the image data.

Note that the image capture direction of the image capture apparatus 100 in the present embodiment is determined based on at least one of the pan value and the tilt value of the image capture apparatus 100. In this specification, a pan value indicates an angle of the image capture direction (optical axis) of the image capture apparatus 100 with respect to the pan direction 105. This angle is set so that one of the end portions of the drive range of the pan drive unit 103 has an angle of 0 degrees. Also, a tilt value indicates an angle of the image capture direction (optical axis) of the image capture apparatus 100 with respect to the tilt direction 106. This angle is set so that one of the end portions of the drive range of the tilt drive unit 104 has an angle of 0 degrees. Also, a zoom value of the image capture apparatus 100 when an image is captured by the image capture apparatus 100 is calculated based on the focal length of the lens 101.

Furthermore, the information processing apparatus 200 according to the present embodiment will be described with reference to FIG. 3. A display control unit 201 causes the display 220 to display an image. For example, the display control unit 201 can cause the display 220 to display an image captured by the image capture apparatus 100. An operation acceptance unit 202 accepts inputs based on user operations via an input device (not shown) such as a keyboard, a mouse, or a touch panel. A communication unit 204 can perform communication with the image capture apparatus 100 via the I/F 440, which will be described later with reference to FIG. 4. For example, the communication unit 204 can transmit, to the image capture apparatus 100, a setting request or control request for the image capture apparatus 100 that was transmitted from a system control unit 203. Also, the communication unit 204 can receive the image data transmitted from the image capture apparatus 100, or a response of the image capture apparatus 100 to the request transmitted to the image capture apparatus 100 from the information processing apparatus 200. The communication unit 204 can transmit the data or response received from the image capture apparatus 100 to the system control unit 203.

The system control unit 203 can control the entire information processing apparatus 200. For example, the system control unit 203 can perform the following processing. The system control unit 203 can generate a setting request or control request for the image capture apparatus 100. The system control unit 203 can generate such a request based on an input of a user accepted by the operation acceptance unit 202. Also, the system control unit 203 can transmit the generated request to the image capture apparatus 100 via the communication unit 204. Furthermore, the system control unit 203 can acquire, via the communication unit 204, a response to the transmitted setting request or control request from the image capture apparatus 100. Thus, the information processing apparatus 200 can control the image capture apparatus 100 via the network 300.

Figure 4:
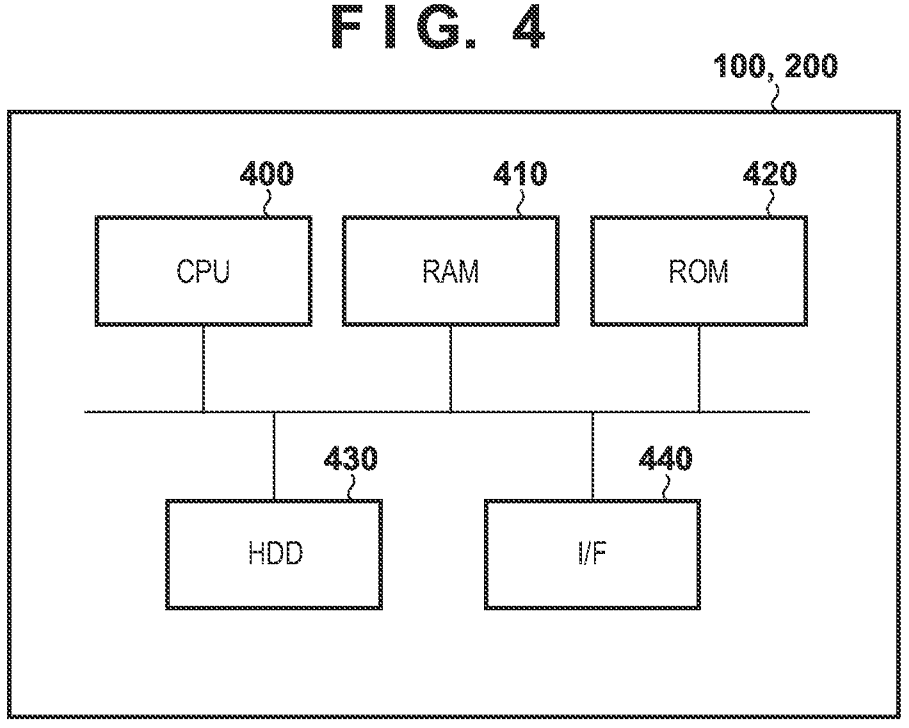
FIG. 4 illustrates a hardware configuration of the apparatuses according to the embodiment.

FIG. 4 shows an example of a hardware configuration that can be used to realize the functions of the image capture apparatus 100 and the information processing apparatus 200. For example, the image capture apparatus 100 can include, in addition to the configurations shown in FIG. 2, the configurations shown in FIG. 4. At least some of the functions of the image capture apparatus 100 shown in FIG. 3 can be realized by a processor such as a CPU 400 executing programs stored in a memory such as a RAM 410, a ROM 420, or an HDD 430. For example, the functions of the image processing unit 112, the system control unit 113, and the PTZ control unit 114 can be realized by processing executed by the CPU 400. Note that the storage unit 115 can be realized by the RAM 410, for example. Also, the communication unit 116 can be realized by the I/F 440, for example.

The information processing apparatus 200 as well can include the configurations shown in FIG. 4. At least some of the functions of the information processing apparatus 200 shown in FIG. 2 can be realized by a processor such as the CPU 400 executing programs stored in a memory such as the RAM 410, the ROM 420, or the HDD 430.

The central processing unit (CPU) 400 is a central processing unit that controls the image capture apparatus 100 as a whole. The Random Access Memory (RAM) 410 can temporarily store a computer program executed by the CPU 400. Also, the RAM 410 provides a work area used when the CPU 400 executes processing. Also, the RAM 410 can function as a frame memory or a buffer memory. The read only memory (ROM) 420 stores programs used when the CPU 400 controls the image capture apparatus 100. The HDD 430 is a storage device in which image data and the like are recorded. The I/F 440 communicates with an external apparatus via the network 300. The I/F 440 can perform communication conforming to TCP/IP and HTTP.

Note that at least some of the functions of the image capture apparatus 100 and the information processing apparatus 200 may be realized by dedicated hardware. For example, processing of displaying a graphical user interface (GUI) or image data on the display 220 may be executed by a graphics processing unit (GPU). Also, processing of reading a program code from the ROM 420 and expanding the read program code on the RAM 410 may be executed by a direct memory access (DMA), which serves as a transfer device.

The operation of the image capture apparatus can be selected from a plurality of modes. Here, the plurality of modes can include a mode (manual mode) in which control information is changed in accordance with an instruction from an external apparatus, and a mode (auto mode) in which control information is controlled by the image capture apparatus.

Figure 5A:
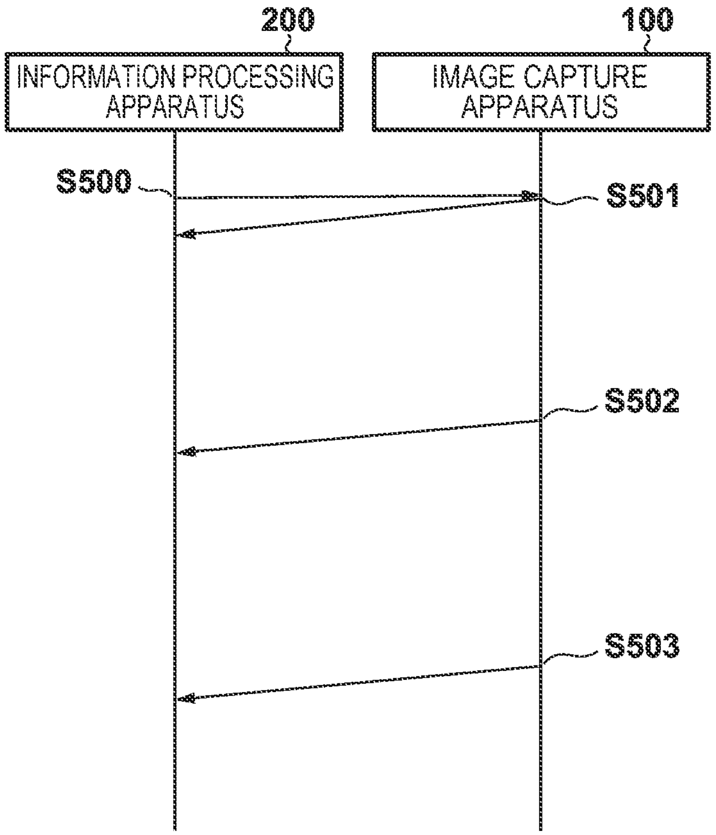
FIG. 5A illustrates an example of an operation sequence of the image capture apparatus.
Figure 5B:
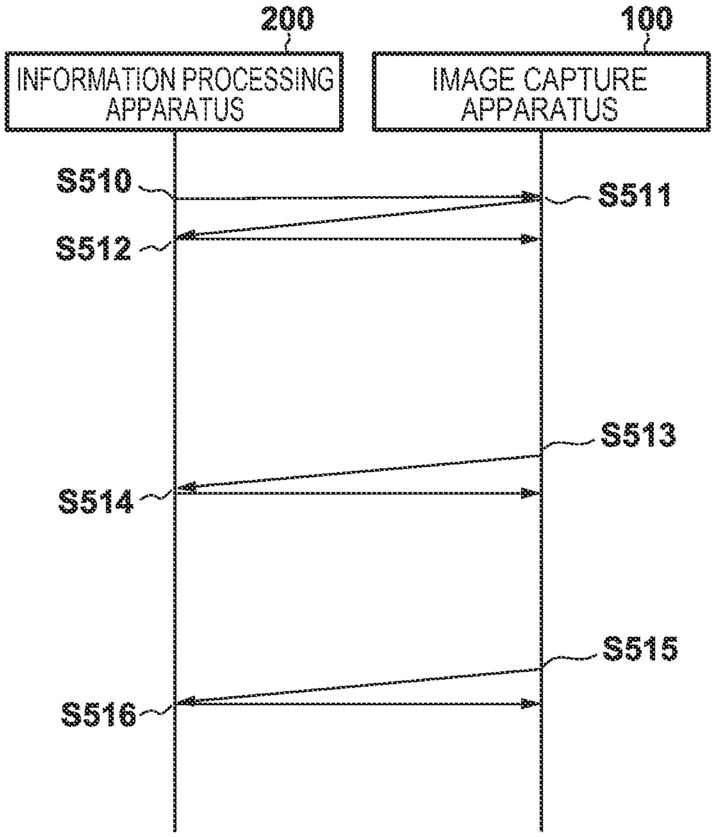
FIG. 5B illustrates an example of an operation sequence of the image capture apparatus.

The following will describe a communication operation between the image capture apparatus 100 and the information processing apparatus 200 while the image capture apparatus 100 is operating in the manual mode, with reference to FIGS. 5A and 5B. In the manual mode, the image capture apparatus 100 operates by being controlled by an external apparatus (e.g., the information processing apparatus 200). In the following example, a description is given about the manual mode with respect to the focus mode. That is to say, in the manual mode, which will be described below, the focus of the image capture apparatus 100 is controlled by an external apparatus.

FIGS. 5A and 5B are sequence diagrams showing control information requests and control information responses, which are transmitted between the image capture apparatus 100 and the information processing apparatus 200. FIG. 5A is a sequence diagram in a mode in which when a control information request is transmitted from the information processing apparatus 200 to the image capture apparatus 100, the image capture apparatus 100 repeatedly notifies the information processing apparatus 200 of the control information.

In step S500, the system control unit 203 of the information processing apparatus 200 transmits a control information request to the image capture apparatus 100 via the communication unit 204. This request is to request the image capture apparatus 100 to send control information of the image capture apparatus 100 to the information processing apparatus 200. In the following example, the control information required to be sent is a focus value.

The system control unit 113 of the image capture apparatus 100 receives the control information request via the network 300 and the communication unit 116. Then, the system control unit 113 acquires the current control information of the image capture apparatus 100. For example, the system control unit 113 can acquire the control information from the image processing unit 112 or the PTZ control unit 114. In this example, it is assumed that the focus value indicated by the control information is 2031.

Subsequently, in step S501, the system control unit 113 notifies the information processing apparatus 200 of the acquired current control information via the communication unit 116. Upon receiving the control information, the system control unit 203 can instruct the display control unit 201 to perform control in such a manner that the received control information is displayed on the display 220.

Subsequently, the system control unit 113 monitors whether or not any change in the control information of the image capture apparatus 100 is made. For this, the system control unit 113 can acquire the control information from the image processing unit 112 or the PTZ control unit 114. In this example, since it is the manual focus mode, the value (focus value) of the control information is not automatically changed.

In step S502, the system control unit 113 receives a control request for changing the focus. Then, the system control unit 113 performs control for changing the focus. For example, the user of the information processing apparatus 200 can give an instruction to perform processing of changing the focus, via the operation acceptance unit 202. At this time, the system control unit 203 transmits the request for changing the focus to the image capture apparatus 100 via the communication unit 204. Note that a configuration is also possible in which an apparatus different from the information processing apparatus 200 transmits a request for changing the focus to the image capture apparatus 100. Upon receiving the request for changing the focus via the communication unit 116, the system control unit 113 instructs the PTZ control unit 114 to change the focus.

Here, the system control unit 113 can detect a change in the control information of the image capture apparatus 100. For example, when having changed the focus, the PTZ control unit 114 can notify the system control unit 113 of the change in the focus value. In response to the change in the control information, the system control unit 113 notifies a different apparatus of the control information. For example, in response to the control information request received in step S500, the system control unit 113 can notify the information processing apparatus 200 of the control information via the communication unit 116. In this example, it is assumed that the focus value indicated by the control information is 1922. Upon receiving the control information, the system control unit 203 can instruct the display control unit 201 to perform control in such a manner that the received control information is displayed on the display 220.

In step S503 as well, in response to the control information (e.g., the focus value) having been changed in accordance with a user instruction, the system control unit 113 can perform notification of the control information (e.g., the focus value of 1803).

FIG. 5B is a sequence diagram in a mode in which, in response to a control information request transmitted from the information processing apparatus 200 to the image capture apparatus 100, the image capture apparatus 100 notifies once the information processing apparatus 200 of control information. In this example, upon acquiring a control information response from the image capture apparatus 100, the information processing apparatus 200 immediately transmits a control information request to the image capture apparatus 100.

Steps S510 and S511 are the same as steps S500 and S501. In step S512, in response to the control information response received in step S511, the system control unit 203 of the information processing apparatus 200 transmits a control information request to the image capture apparatus 100 via the communication unit 204. Upon receiving the control information request from the communication unit 116 via the network 300, the system control unit 113 of the image capture apparatus 100 monitors whether or not the control information has been changed. For this, the system control unit 113 can acquire the control information from the image processing unit 112 or the PTZ control unit 114. In this example, since it is the manual focus mode, the value (focus value) of the control information is not automatically changed.

Step S513 is the same as step S502. In step S514, similar to step S512, the system control unit 203 transmits a control information request to the image capture apparatus 100.

Next, in step S515 as well, similar to step S513, in response to the control information (e.g., the focus value) having been changed in accordance with a user instruction, the system control unit 203 can perform notification of the control information (e.g., the focus value). Step S516 is executed similar to step S514.

As described above, it is clear that, when the image capture apparatus 100 is operating in the manual mode, the frequency of notification of control information from the image capture apparatus 100 to the information processing apparatus 200 is not high in both of the modes in FIGS. 5A and 5B.

The following will describe a communication operation between the image capture apparatus 100 and the information processing apparatus 200 while the image capture apparatus 100 is operating in the auto mode, with reference to FIGS. 5A and 5B. In the auto mode, the image capture apparatus 100 automatically changes control information. In the following example, a description is given about the auto mode with respect to the focus mode. That is to say, in the auto mode, which will be described below, the focus of the image capture apparatus 100 is autonomously controlled by the image capture apparatus 100.

The following will first describe, with reference to FIG. 5A, a mode in which when a control information request is transmitted from the information processing apparatus 200 to the image capture apparatus 100, the image capture apparatus 100 repeatedly notifies the information processing apparatus 200 of control information.

Steps S500 and S501 are executed in the above-described manner. Subsequently, the system control unit 113 of the image capture apparatus 100 monitors whether or not any change in the control information of the image capture apparatus 100 is made. For this, the system control unit 113 can acquire the control information from the image processing unit 112 or the PTZ control unit 114. In this example, since it is the auto focus mode, the value (focus value) of the control information is automatically and continuously changed based on the state of a subject. Therefore, the PTZ control unit 114 can notify the system control unit 113 of changes in the focus value, without any user operation. Accordingly, the system control unit 113 may continually detect a change in the control information of the image capture apparatus 100.

Here, the system control unit 113 detects a change in the control information of the image capture apparatus 100. Furthermore, the system control unit 113 determines whether or not to perform control for restricting notification of the control information based on whether or not the image capture apparatus 100 is operating in a specific mode. In this example, since the image capture apparatus 100 is operating in the auto mode, the system control unit 113 performs control for restricting notification of the control information. For example, if a predetermined period of time has elapsed since the previous control information response was transmitted, the system control unit 113 can determine to perform notification of the control information. Then, if it is determined to perform notification of the control information, the system control unit 113 notifies a different apparatus of the control information, similar in step S502. For example, in response to the control information request received in step S500, the system control unit 113 can notify the information processing apparatus 200 of the control information via the communication unit 116. Upon receiving the control information, the system control unit 203 of the information processing apparatus 200 can instruct the display control unit 201 to perform control in such a manner that the received control information is displayed on the display 220.

In step S503 as well, the system control unit 113 can perform notification of the control information, based on detection of any change in the control information and determination as to whether or not to perform notification of the control information.

Then, the following will describe, with reference to FIG. 5B, a mode in which the image capture apparatus 100 notifies once the information processing apparatus 200 of control information in response to a control information request given from the information processing apparatus 200 to the image capture apparatus 100.

Steps S510 to S512 are executed in the above-described manner. Subsequently, the system control unit 113 of the image capture apparatus 100 monitors whether or not any change in the control information of the image capture apparatus 100 is made. Also in this case, since it is the auto focus mode, the system control unit 113 may continually detect a change in the control information of the image capture apparatus 100.

Step S513 is the same as step S502. That is to say, the system control unit 113 can perform notification of the control information, based on detection of any change in the control information and determination as to whether or not to perform notification of the control information.

In step S514, similar to step S512, the system control unit 203 transmits a control information request to the image capture apparatus 100. In step S515 as well, similar to step S513, the system control unit 203 can perform notification of the control information, based on detection of any change in the control information and determination as to whether or not to perform notification of the control information. Step S516 is also executed similar to step S514.

As described above, in the present embodiment, upon detection of a change in control information of the image capture apparatus 100, the system control unit 113 further determines whether or not to perform notification of control information. With this configuration, even when the image capture apparatus 100 is operating in the auto mode, it is possible to suppress the frequency of notification of control information from the image capture apparatus 100 to the information processing apparatus 200. In the auto mode, there is a possibility that control information of the image capture apparatus 100 may be changed continually. Accordingly, if, in step S502, the system control unit 113 transmits control information in response to detection of a change in the control information as in the case where the image capture apparatus 100 is operating in the manual mode, there is a possibility that the control information is continuously and repeatedly notified within a short period of time. According to the configuration of the present embodiment, the frequency of notification of the control information can be suppressed compared to such a case. Accordingly, it is possible to reduce the processing loads of the image capture apparatus 100 and the information processing apparatus 200.

On the other hand, according to the present embodiment, when the image capture apparatus 100 is operating in the manual mode, the system control unit 113 can immediately perform notification of control information upon detection of a change in the control information of the image capture apparatus 100. Particularly, in the manual mode, even when the control information of the image capture apparatus 100 is changed by an apparatus different from the information processing apparatus 200, the information processing apparatus 200 can rapidly receive a notification of the control information. Therefore, information update response at a client is improved. On the other hand, since, in the manual mode, there is a low possibility that notification of control information is performed continuously and repeatedly within a short period of time, an increase in the processing load of the image capture apparatus 100 and the information processing apparatus 200 is not expected.

Figure 7:
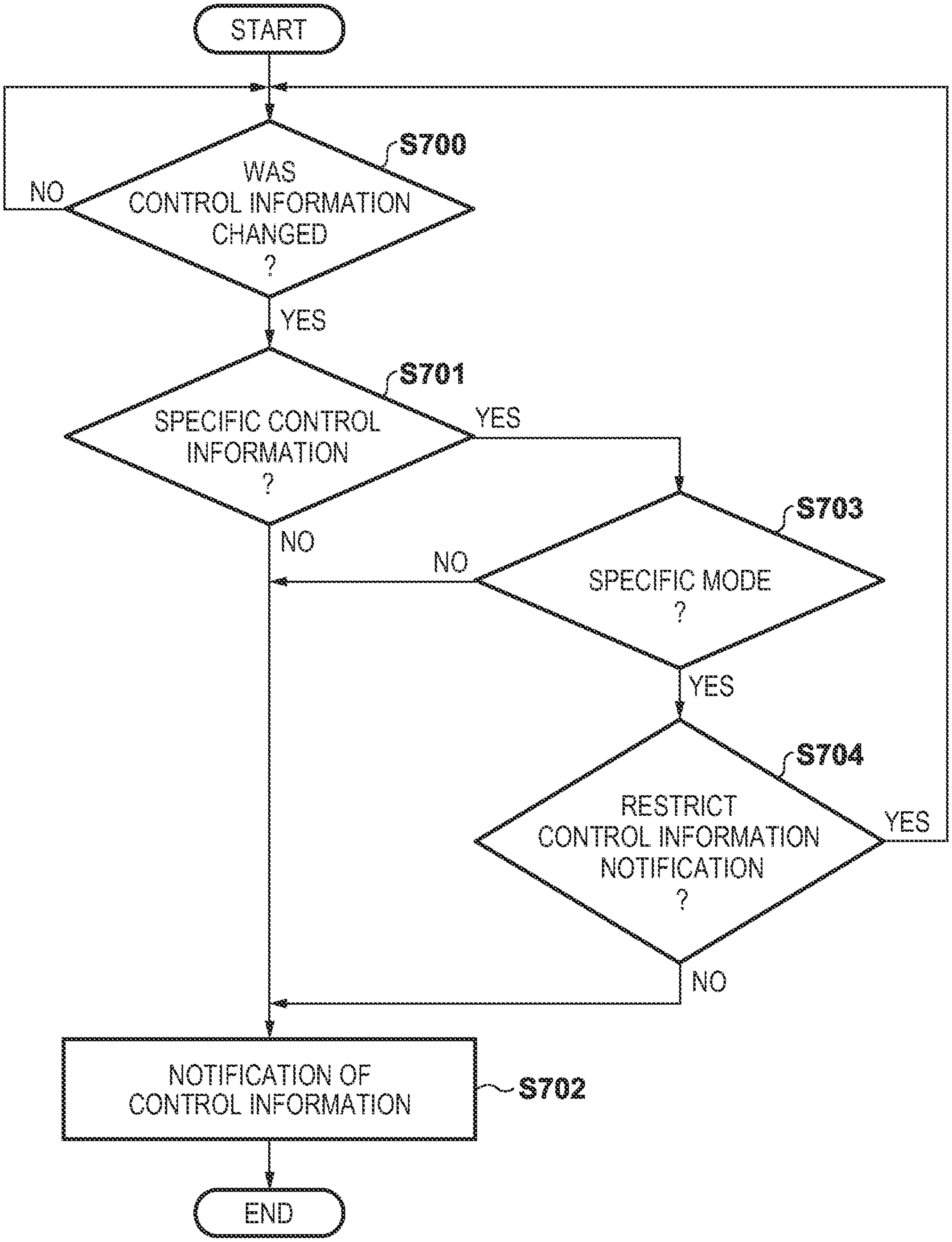
FIG. 7 is a flowchart illustrating an example of a method for controlling the image capture apparatus.

The following will describe in more detail a control method performed by the system control unit 113 according to the present embodiment, with reference to the flowchart in FIG. 7. The method shown in FIG. 7 can be used in the mode as shown in FIG. 5B in which, in response to a control information request transmitted from the information processing apparatus 200 to the image capture apparatus 100, the image capture apparatus 100 notifies once the information processing apparatus 200 of control information. In a case where, as shown in FIG. 5A, when a control information request is transmitted from the information processing apparatus 200 to the image capture apparatus 100, the image capture apparatus 100 repeatedly notifies the information processing apparatus 200 of control information, the system control unit 113 can repeatedly perform the procedure shown in FIG. 7.

The processing according to the flowchart of FIG. 7 starts when the image capture apparatus 100 has received a control information request from the information processing apparatus 200. This control information request includes information that designates control information required to be transmitted.

First, in step S700, the system control unit 113 determines whether or not the control information of the image capture apparatus has been changed. For this, the system control unit 113 can acquire the current control information from the image processing unit 112 or the PTZ control unit 114, and monitors whether or not the control information has been changed. The system control unit 113 can acquire the control information requested by the control information request, and can determine whether or not the control information has been changed. If it is determined that the control information has been changed, the procedure moves to step S701.

In step S701, the system control unit 113 determines whether or not the requested control information is specific control information. In the present embodiment, the system control unit 113 determines whether or not to perform control for restricting notification of the control information based on the type of control information to be transmitted. In an embodiment, the specific control information indicates a parameter that changes serially. Also, in an embodiment, the specific control information is information to be autonomously controlled by the image capture apparatus 100. For example, the specific control information is information that is changed by the image capture apparatus 100 in the auto mode. The specific control information may be controlled by the PTZ control unit 114, based on the result of distance measurement or photometric measurement performed by the image capture apparatus 100. For example, the PTZ control unit 114 can control the focus value, F number, or gain (or ISO sensitivity) based on the result of distance measurement or photometric measurement. Also, the specific control information may be controlled by the PTZ control unit 114, based on the result of object detection from an image captured by the image capture apparatus 100. For example, the PTZ control unit 114 can control the focus value so that a specific object is brought into focus. Also, the PTZ control unit 114 can control the pan value or tilt value so that a specific object appears in the center of a captured image. Also, the PTZ control unit 114 can control the zoom value so that the size of a specific object is maintained.

In an embodiment, the specific control information is information whose value is serially changed. For example, the specific control information may be a parameter selected from three or more values, a parameter expressed in 8 bits or more, or a parameter expressed in 16 bits or more.

Concrete examples of the specific control information include a focus distance (e.g., focus value), exposure control information (e.g., F number or shutter speed), gain (or ISO sensitivity), and color control information (e.g., white balance value). Other concrete examples of the specific control information include information relating to an image capture direction (e.g., a pan value or a tilt value) and information relating to an image capture magnification (e.g., a zoom value).

If the requested control information is not specific control information, the procedure moves to step S702. In this case, the system control unit 113 can immediately transmit the control information acquired in step S700 to the information processing apparatus 200 via the communication unit 116. If the requested control information is specific control information, the procedure moves to step S703.

Specific control information as described above is likely to be changed continually. Accordingly, by performing control for restricting notification of the specific control information, it is possible to effectively reduce the frequency of notification of the control information. On the other hand, in the present embodiment, upon detection of a change in another type of control information, the system control unit 113 can immediately perform notification of the control information. Therefore, information update response at a client is improved.

In step S703, the system control unit 113 determines whether or not the image capture apparatus 100 is operating in a specific mode. In the present embodiment, the specific mode refers to the auto mode. In an embodiment, the specific mode refers to a mode in which the image capture apparatus 100 automatically changes requested control information. For this, the system control unit 113 can acquire information indicating the control state of the requested control information, from the image processing unit 112 or the PTZ control unit 114. If the image capture apparatus 100 is not operating in the specific mode, the procedure moves to step S702. Also in this case, the system control unit 113 can immediately transmit the control information acquired in step S700 to the information processing apparatus 200 via the communication unit 116. If the image capture apparatus 100 is operating in the specific mode, the procedure moves to step S704.

In step S704, the system control unit 113 performs control for restricting notification of the control information. In the present embodiment, the system control unit 113 restricts notification of the control information so that the interval of notifying a different apparatus of the control information is greater than or equal to a threshold. For this, the system control unit 113 can acquire, from the storage unit 115, time information indicating the time at which the system control unit 113 has recently notified the information processing apparatus 200 of the same type of control information as the requested control information. Then, the system control unit 113 compares the acquired time information with current time information to calculate the elapsed time from when the system control unit 113 has recently transmitted the control information. Then, the system control unit 113 can determine whether or not the calculated elapsed time is greater than or equal to a threshold stored in the storage unit 115.

Note that the threshold may be a predetermined fixed value. Also, this threshold may be a value designated by a user through the information processing apparatus 200.

If the elapsed time thus calculated is less than the threshold, transmission of the control information is cancelled and the procedure returns to step S700. Thus, the transmission of the control information is deferred so as to be performed at later time. On the other hand, if the calculated elapsed time is greater than or equal to the threshold, the system control unit 113 stores the current time information in the storage unit 115. Then, the procedure moves to step S702, where the system control unit 113 transmits the control information acquired in step S700 to the information processing apparatus 200 via the communication unit 116.

The control method in step S704 is not limited to the method of restricting notification of the control information based on the interval of notification of the control information as described above. For example, notification of the control information may be restricted based on the frequency of notification of the control information. The system control unit 113 can restrict notification of the control information so that the frequency of notification of the control information to a different apparatus is not greater than a threshold. Specifically, the system control unit 113 can determine the number of times the same type of control information as the requested control information has been notified during a predetermined period of time in the past (for example, one second). If this number of times exceeds a threshold, the system control unit 113 can cancel or defer the transmission of the control information.

As another example, notification of the control information may be restricted based on the amount of change in the control information. For example, the system control unit 113 may restrict notification of the control information so as to suppress the difference in the control information to be notified successively from becoming less than a threshold. Specifically, the system control unit 113 can acquire, from the storage unit 115, the same type of control information as the requested control information that was recently notified to the information processing apparatus 200. Then, the system control unit 113 compares the control information acquired from the storage unit 115 with the control information acquired in step S700 to calculate the difference in the control information. Then, the system control unit 113 can determine whether or not the calculated difference is not smaller than a predetermined threshold. If the difference is smaller than the threshold, the system control unit 113 can cancel or defer the transmission of the control information.

This threshold may be determined in advance according to the type of control information. FIG. 6 is a table showing examples of the relationship between the type of control information and corresponding thresholds. Table 600 shows thresholds 602 for control information 601 such as a focus value 603, a F number 604, a gain 605, and a white balance value (WB) 606. The system control unit 113 can acquire this table 600 from the storage unit 115. The system control unit 113 can also acquire a threshold that corresponds to requested control information from the table 600. For example, if the requested control information is F number, the threshold is 5. Note that such a threshold may be a predetermined fixed value. This threshold may also be a value designated by a user through the information processing apparatus 200.

As another example, notification of control information may be restricted based on the processing load of the image capture apparatus 100 or a different apparatus (for example, the information processing apparatus 200), which is a destination of notification of the control information. For example, notification of control information may be restricted based on the CPU utilization ratio of the image capture apparatus 100 or the information processing apparatus 200. Specifically, the system control unit 113 can determine whether or not the current utilization ratio of the CPU 400 of the image capture apparatus 100 or the information processing apparatus 200 exceeds a threshold. The system control unit 113 can acquire, from the information processing apparatus 200, information indicating the utilization ratio of the CPU 400 of the information processing apparatus 200, via the communication unit 116. If the utilization ratio exceeds the threshold, the system control unit 113 can cancel or defer the transmission of the control information.

As yet another example, notification of control information may be restricted based on the load on a communication path used when the image capture apparatus 100 gives a notification of control information, or the status of the communication path. For example, notification of control information may be restricted based on information (for example, a bit rate or packet drop) relating to the communication band of the network 300, acquired via the communication unit 116. Specifically, the system control unit 113 can determine whether or not the bit rate of the network 300 is not smaller than a threshold. If the bit rate is less than the threshold, the system control unit 113 can cancel or defer the transmission of the control information.

The above-described control methods may be used in combination. For example, the system control unit 113 can restrict notification of control information so that the interval of notification of the control information is greater than or equal to the threshold, and the difference in the control information to be notified successively is greater than or equal to the threshold. Specifically, as described above, the system control unit 113 can compare the time information acquired from the storage unit 115 with the current time information to calculate the elapsed time from when the system control unit 113 has recently transmitted the control information. Also, as described above, the system control unit 113 can compare the control information acquired from the storage unit 115 with the control information acquired in step S700 to calculate the difference in the control information. In this case, if the calculated elapsed time is greater than or equal to the threshold, and the calculated difference is greater than or equal to the threshold, the procedure moves to step S702. Otherwise, the system control unit 113 can cancel or defer the transmission of the control information.

Note that in step S704, the system control unit 113 can restrict notification of the control information based on the interval of transmission of the same type of control information, or the frequency of transmission thereof. For example, the system control unit 113 can calculate the elapsed time from when the system control unit 113 has recently transmitted the same type of control information as the control information requested by a control information request. On the other hand, the system control unit 113 may restrict notification of control information based on the interval of transmission of an appropriate type of control information, or the frequency of transmission thereof.

Also, the system control unit 113 can restrict notification of the control information based on the interval of transmission of control information to be transmitted to the same apparatus, the frequency of transmission thereof, or the amount of change in the control information. For example, the system control unit 113 can calculate the elapsed time from when the system control unit 113 has recently transmitted the control information to the same apparatus as the apparatus (e.g., information processing apparatus 200) that has transmitted a control information request. On the other hand, the system control unit 113 may restrict notification of the control information based on the interval of transmission of the control information to be transmitted to an appropriate apparatus, the frequency of transmission thereof, or the amount of change in the control information.

Also, in the processing shown in FIG. 7, the control for restricting notification of control information is performed if the requested control information is specific control information and the image capture apparatus 100 is operating in a specific mode. However, in another embodiment, the control for restricting notification of control information may be performed if the image capture apparatus 100 is operating in a specific mode, regardless of the type of requested control information. In yet another embodiment, the control for restricting notification of control information may be performed if requested control information is specific control information, regardless of the operating mode of the image capture apparatus 100.

According to the above-described embodiment, notification of control information is controlled based on the operating mode of the image capture apparatus 100. Accordingly, it is possible to perform more appropriate notification control according to the need of notification control.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-071691, filed Apr. 25, 2023, which is hereby incorporated by reference herein in its entirety.

What is claimed is:

1. An image capture apparatus comprising:
an image sensor configured to perform image capture to generate a captured image;
at least one processor configured to:
notify an external apparatus of control information of the image capture apparatus, in response to a change in the control information, the image capture apparatus having a plurality of modes including a first mode in which the image capture apparatus changes the control information in accordance with an instruction from an external control apparatus, and a second mode in which the image capture apparatus automatically changes the control information; and
perform control for restricting notification of the control information to the external apparatus, based on the image capture apparatus is operating in the second mode.

2. The image capture apparatus according to claim 1, wherein the at least one processor is further configured to determine whether or not to perform control for restricting notification of the control information to the external apparatus, based on a type of the control information to be notified.

3. The image capture apparatus according to claim 1, wherein the control information is a parameter that changes serially.

4. The image capture apparatus according to claim 1, wherein the control information is autonomously controlled by the image capture apparatus.

5. The image capture apparatus according to claim 1, wherein the control information is a focus distance, exposure control information, a gain, color control information, an image capture direction, or image capture magnification information.

6. The image capture apparatus according to claim 1, wherein the at least one processor is configured to restrict notification of the control information to the external apparatus so that an interval of the notification of the control information to the external apparatus is greater than or equal to a threshold.

7. The image capture apparatus according to claim 1, wherein the at least one processor is configured to restrict notification of the control information to the external apparatus so that a frequency of the notification of the control information to the external apparatus is smaller than or equal to a threshold.

8. The image capture apparatus according to claim 1, wherein the at least one processor is configured to restrict successive notification of pieces of the control information to the external apparatus in an event where a difference of the values indicated by the pieces of the control information is less than a threshold.

9. The image capture apparatus according to claim 1, wherein the at least one processor is configured to restrict notification of the control information to the external apparatus further based on a processing load of the image capture apparatus or the external apparatus.

10. The image capture apparatus according to claim 1, wherein the at least one processor is configured to restrict notification of the control information to the external apparatus further based on a load on a communication path of the notification of the control information or a status of the communication path.

11. The image capture apparatus according to claim 1, wherein the second mode is a mode in which the at least one processor is able to notify the external apparatus of the control information of the image capture apparatus.

12. The image capture apparatus according to claim 1, wherein, in the second mode, the at least one processor is configured to notify the external apparatus of the control information of the image capture apparatus after a predetermined time has elapsed since a previous notification.

13. The image capture apparatus according to claim 1, wherein the control information of the image capture apparatus affects the captured image generated by the image sensor.

14. The image capture apparatus according to claim 1, wherein the at least one processor is configured to notify the external apparatus of the control information of the image capture apparatus both in the first mode and the second mode, wherein the frequency of notification to the external apparatus in the first mode is higher than the frequency of notification to the external apparatus in the second mode.

15. A method of controlling an image capture apparatus, comprising:

performing image capture to generate a captured image;

notifying an external apparatus of control information of the image capture apparatus, in response to a change in the control information, the image capture apparatus having a plurality of modes including a first mode in which the image capture apparatus changes the control information in accordance with an instruction from an external control apparatus, and a second mode in which the image capture apparatus automatically changes the control information; and performing control for restricting notification of the control information to the external apparatus, based on the image capture apparatus operating in the second mode, wherein the image capture apparatus has a plurality of modes.

16. A non-transitory computer-readable medium storing a program executable by a computer to perform a method of controlling an image capture apparatus, comprising:

performing image capture to generate a captured image;

notifying an external apparatus of control information of the image capture apparatus, in response to a change in the control information, the image capture apparatus having a plurality of modes including a first mode in which the image capture apparatus changes the control information in accordance with an instruction from an external control apparatus, and a second mode in which the image capture apparatus automatically changes the control information; and performing control for restricting notification of the control information to the external apparatus, based on the image capture apparatus operating in the second mode.

* * * * *